J. C. HEYMAN.
STUMP PULLER.
APPLICATION FILED DEC. 14, 1907.
No. 898,887.
Patented Sept. 15, 1908.
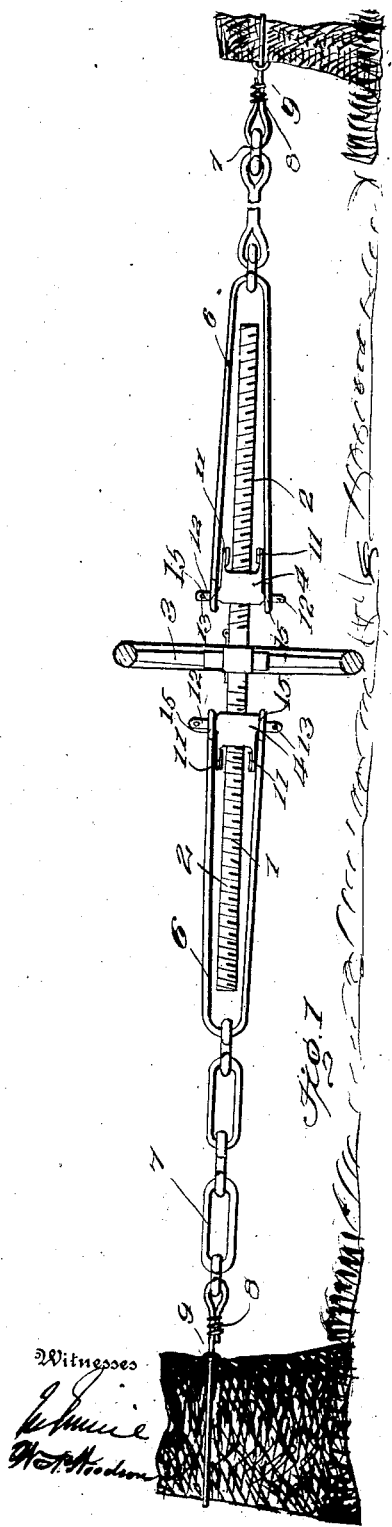
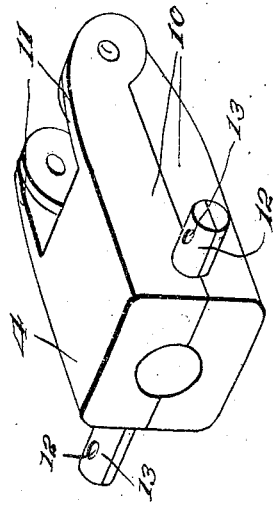
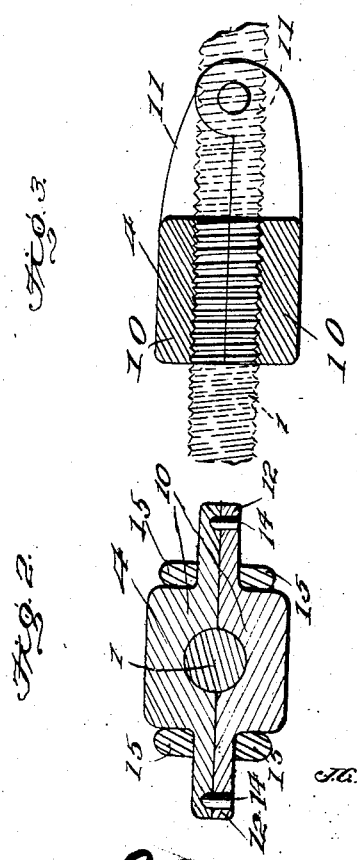
Inventor
J. C. Heyman

UNITED STATES PATENT OFFICE.

JOSEPH C. HEYMAN, OF MINNEAPOLIS, MINNESOTA.

STUMP-PULLER.

No. 898,887.　　Specification of Letters Patent.　　Patented Sept. 15, 1908.

Application filed December 14, 1907. Serial No. 406,481.

*To all whom it may concern:*

Be it known that I, JOSEPH C. HEYMAN, a citizen of the United States, residing at Minneapolis, in the county of Hennepin and State of Minnesota, have invented certain new and useful Improvements in Stump-Pullers, of which the following is a specification.

This invention contemplates certain new and useful improvements in stump pullers of the screw type and the object of the invention is a simple, durable and efficient construction of stump puller which may be quickly adjusted and conveniently applied to a stump and which may be manually operated with a minimum consumption of power to effectually tear the stump out of the ground.

With this and other objects in view as will more fully appear as the description proceeds the invention consists in certain constructions and arrangements of the parts that I shall hereinafter fully describe and then point out the novel features thereof in the appended claims.

For a full understanding of the invention and the merits thereof, reference is to be had to the following description and accompanying drawing, in which:

Figure 1 is a view in elevation of my improved stump puller showing it applied. Fig. 2 is a transverse section of a nut. Fig. 3 is a longitudinal section thereof, and Fig. 4 is a perspective view of the nut.

Corresponding and like parts are referred to in the following description and indicated in all the views of the drawing by the same reference characters.

The numeral 1 designates the actuating shaft of my improved stump puller, the ends of which are oppositely threaded as indicated at 2, a wheel 3 being keyed or otherwise rigidly mounted on the shaft between the threaded portions 2 thereof. Nuts 4 are mounted on the respective threaded portions 2 and flexible connecting members are secured at one end to the said nuts and are designed to be fastened at their other ends to stumps or the like.

In the present instance the connecting members comprise stirrups 6 secured at their ends to said nuts and extending outwardly beyond the ends of the shaft, chains 7 fastened at one end to the stirrups and having open links to permit the ready adjustment of their lengths, and preferably steel cables 8 secured to the other ends of the chains and provided with slip nooses 9 adapted to encircle a stump.

The nuts 4 are constructed respectively in two sections 10 to permit their quick adjustment on the threaded portions 2, the sections 10 being formed at their outer ends on opposite sides of the shaft with ears 11 and being pivotally secured together by rivets or the like passing through the corresponding pairs of ears. The nuts 4 are formed on two opposite sides with angularly disposed lugs 12 which are constructed in halves secured to the respective sections 10, and which are formed with openings 13 extending transversely through said halves. A pin 14 is fitted in the opening in one half of the lug 12 and is designed to be received in the opening in the other half to hold the two sections 10 of the nuts 4 in proper alinement. Eyes 15 formed at each end of the stirrup 6, normally encircle the respective lugs 12 of the nuts 4, and serve to hold the halves of said lugs together and thus prevent any spreading apart of the forward ends of said nuts.

In the practical operation of my improved stump puller, the sides of each stirrup 6 are sprung apart until the eyes 15 are forced out of engagement with the lugs 12. The sections 10 of the nuts 4 are then swung apart, and the nuts are quickly adjusted to the extreme ends of the shaft and the stirrups returned to position. The apparatus is attached at one end to the stump to be pulled, by means of the noose 9 of a cable 8, the other end being anchored to a relatively stationary object such as a firmer stump than the one to be pulled. The length of the chains 7 is adjusted so that the apparatus is taut and the operator turns the shaft in the proper direction by means of the wheel 3. This turning obviously results in the movement of the nuts toward each other which decreases the distance between the ends of the apparatus and thus uproots the stump.

Having thus described the invention, what I claim is:

1. A stump puller embodying an actuating shaft formed with oppositely threaded portions, nuts mounted upon the respective threaded portions and formed in sections pivotally secured together, and means for holding said sections rigidly together and in engagement with the threads of the actuating shaft.

2. A stump puller comprising an actuating shaft formed with oppositely threaded portions, nuts mounted on the respective threaded portions, said nuts being constructed in sections pivotally secured together and formed with two angularly disposed sectional lugs, and means for engaging said lugs, to hold the sections thereof together.

3. A stump puller comprising an actuating shaft formed with oppositely threaded portions, nuts mounted on the respective threaded portions, and flexible connecting members secured to the nuts, said nuts being constructed in separable sections, as and for the purpose set forth.

4. A stump puller embodying an actuating shaft formed with oppositely threaded portions, nuts mounted on the respective threaded portions and formed in sections pivotally secured together, and connecting members secured to the respective nuts and adapted to hold the sections thereof rigidly together.

5. A stump puller comprising an actuating shaft formed with oppositely threaded portions, nuts mounted on the respective threaded portions, said nuts being constructed in sections pivotally secured together and being formed with two angularly disposed sectional lugs, and connecting members embodying stirrups formed at their ends with eyes normally encircling the lugs, as and for the purpose set forth.

6. A stump puller comprising an actuating shaft formed with oppositely threaded portions, nuts mounted on the respective threaded portions, said nuts being constructed in sections pivotally secured together and formed with two angularly disposed sectional lugs, one section of each of said lugs being formed with a pin, and the other section being formed with an opening arranged to receive the pin, to hold the sections of the lugs in alinement, and means for engaging said lugs, to hold the sections thereof rigidly together.

In testimony whereof I affix my signature in presence of two witnesses.

JOSEPH C. HEYMAN. [L. S.]

Witnesses:
E. S. Prince,
C. H. Button.